US006981268B2

(12) United States Patent
Shi et al.

(10) Patent No.: US 6,981,268 B2
(45) Date of Patent: Dec. 27, 2005

(54) SYSTEM AND METHOD FOR PERSISTING AND RESOLVING APPLICATION ASSEMBLY BINDS

(75) Inventors: Alan Shi, Redmond, WA (US); Srivatsan Parthasarathy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 10/010,694

(22) Filed: Dec. 5, 2001

(65) Prior Publication Data

US 2003/0105889 A1 Jun. 5, 2003

(51) Int. Cl.$^7$ ............................................... G06F 9/00
(52) U.S. Cl. ..................................................... 719/331
(58) Field of Search ........ 719/331, 332; 717/162–167, 717/170; 707/203, 100

(56) References Cited

U.S. PATENT DOCUMENTS

| | | | |
|---|---|---|---|
| 5,303,379 A * | 4/1994 | Khoyi et al. ................. | 717/166 |
| 5,408,665 A * | 4/1995 | Fitzgerald .................... | 717/163 |
| 5,414,846 A * | 5/1995 | Lemble et al. ................. | 713/1 |
| 5,615,400 A * | 3/1997 | Cowsar et al. .............. | 719/332 |
| 5,619,716 A * | 4/1997 | Nonaka et al. ............. | 717/167 |
| 5,634,114 A * | 5/1997 | Shipley ....................... | 717/170 |
| 5,649,200 A * | 7/1997 | Leblang et al. ............. | 717/122 |
| 5,758,154 A * | 5/1998 | Qureshi .......................... | 713/1 |
| 5,878,262 A * | 3/1999 | Shoumura et al. .......... | 717/164 |
| 6,185,734 B1 * | 2/2001 | Saboff et al. ................ | 717/164 |
| 6,202,205 B1 * | 3/2001 | Saboff et al. ................ | 717/151 |
| 6,247,175 B1 * | 6/2001 | Ledford et al. ............. | 717/157 |
| 6,301,592 B1 * | 10/2001 | Aoyama et al. ............ | 715/511 |
| 6,449,624 B1 * | 9/2002 | Hammack et al. .......... | 707/203 |
| 6,505,204 B1 * | 1/2003 | Fanjoy ........................ | 707/100 |
| 6,704,797 B1 * | 3/2004 | Fields et al. ................ | 709/246 |
| 6,871,344 B2 * | 3/2005 | Grier et al. ................. | 717/162 |
| 2002/0019972 A1 * | 2/2002 | Grier et al. .................... | 717/3 |

OTHER PUBLICATIONS

J. Richter, .NET Framework: Building, Packaging, Deploying, and Administering Applications and Types-Part 2, http://msdn.microsoft.com/msdnmag/issues/01/03/build-apps2/default.aspx, Mar., 2001.*
(No name given) .NET Framework Tutorials: Assembly Binding Log Viewer, http://msdn.microsoft.com/library/default.asp?url=/library/en-us/cptutorials/html/assembly_binding_log_viewer_deployment.asp, 2005.*

* cited by examiner

*Primary Examiner*—Sue Lao
(74) *Attorney, Agent, or Firm*—Senniger Powers

(57) ABSTRACT

A system and method are presented that persist assembly bind information for applications at each stage of execution of the assembly policy. New assembly bind history files are created and persisted to disc when changes in assembly bind policy results in a change in the assemblies with which the application binds. This persisted information is used to reconfigure assembly binds to a prior state when operation of the application conformed to a user's desires. Since this assembly bind reconfiguration is on a per application basis, only the binding of the selected application is affected. Likewise, the assembly bind history files are associated with a particular user to allow personalized execution of applications on a system.

3 Claims, 7 Drawing Sheets

FIG. 5a

Calculator ⟋ 266

| Date/Time | Information |
|---|---|
| System | v.1.0.0.0 |
|  | v.1.0.0.0 |
|  | v.1.0.0.0 |
|  | v.1.0.0.0 |
| Math | v.1.0.0.0 |
|  | v.1.0.0.0 |
|  | v.1.0.0.0 |
|  | v.1.0.0.0 |
|  | • |
|  | • |
|  | • |

FIG. 5b

Calculator ⟋ 268

| Date/Time | Information |
|---|---|
| System | v.1.0.0.0 |
|  | v.1.0.0.0 |
|  | v.1.0.0.0 |
|  | v.1.0.0.0 |
| Math | v.1.0.0.0 |
|  | v.1.0.0.0 |
|  | v.1.0.0.1 |
|  | v.1.0.0.1 |
|  | • |
|  | • |
|  | • |

SYSTEM AND METHOD FOR PERSISTING AND RESOLVING APPLICATION ASSEMBLY BINDS

FIELD OF THE INVENTION

The present application relates generally to application assembly bind histories, and more particularly to systems and methods for resolving .dll versioning problems created by overwriting shared components with different versions of that shared component.

BACKGROUND OF THE INVENTION

While modem application programs provide various specialized functions tailored to meet the needs of particular types of clients, these applications utilize, at their core, a number of common functions. While the code to execute these common functions may easily be incorporated into each application program, such would increase the size and complexity of these application programs, and would increase their cost due to the increased manpower needed to duplicate code for these common functions. Because so many common functions exist, it was recognized early on that the code for these functions could be stored in an accessible library, the components of which could simply be called by the application program when such a function were needed. This greatly simplifies the programming necessary within an application and reduces the cost associated with the initial coding and development of that program.

The various functions are contained in separately named files which are called by the application program when that function is to be performed. In a Windows environment, such shared functions are stored in dynamic link library (DLL) files ending with the extension .dll. All these .dll files are typically stored in a common directory, e.g. c:\WinNT\System32\*.dll. While many core .dll files are provided with the operating system, new application programs loaded on a computer are often shipped with the .dll files needed for its proper operation. During installation of the application program, the application and all of its components (.dll files) are installed. If one of the shared components already exists, most installation programs will simply overwrite the already installed .dll file with the component included with the application that is being installed. While some installation programs provide the user with a choice of whether or not to install the shared component that is provided with the application program, choosing not to install this .dll file may result in the application being installed not working properly. Therefore, most users typically install all the components provided with the application program to ensure its successful operation.

However, while installing the provided .dll file should guarantee successful operation of the application being installed, it is no guarantee that applications installed previously that use that same shared .dll file will continue to operate properly with the version that overwrote the shared component that was originally installed when the other program was installed. Unfortunately, since the code that loads the .dll files does not express any versioning information of the .dll that it wants to load, and hence loads any .dll that has the same name as that for which it was looking, a subsequent failure of an application program to operate properly due to a shared component being overwritten with a different version of that component was difficult to fix.

A feature provided in the Windows ME operating system called "System Restore" allows users to essentially choose which versions of the shared components to put in the shared location. This feature keeps track of every time a user installs or uninstalls an application, and records the state of things like the registry and the contents of the directory \winnt\system32 before and after the install or uninstall. When a user chooses to rollback, the feature simply installs or uninstalls applications to try to get back to the state that existed before the last install or uninstall. In this way, if the installation of a new application causes other applications to break due to the overwriting of the shared component with a new version of that component, System Restore allows the user to effectively reinstall the old version of the shared component so that all application programs will use that older version of that shared component. If the new application will not operate properly with the old version of the shared component, System Restore will allow the user to replace that older version with the newer version so that the new application can operate correctly, although the old applications may again break. This presents a significant advantage over prior system that did not have this ability. However, this system still allows only a single shared component that must be used by all applications that require that shared component to be stored in the shared location. As such, a user may have to access the system restore function multiple times to operate different application programs in the situation just discussed.

BRIEF SUMMARY OF THE INVENTION

In view of the above, it is an object of the invention to provide a new and improved system and method for tracking application assembly bind information. Preferably, the system and method of the present invention provides a mechanism for storing and indexing this information for each application bind, and for subsequent application binds that result in a different version of an assembly when the application is run. The system and method of the present invention also allows more subtle operational characteristic flaws to be corrected if the operation does not conform to a desired mode of operation as determined by a user.

In one embodiment of the present invention a application restore tool is provided that includes a user interface that allows a user to reconfigure the assembly binds to a state when the application operated properly, according to the user. Initially, this embodiment of the application restore tool provides a default selection to the previous bind for all assemblies used by the application. This is based on the assumption that the application operated properly the previous time it was run, and that the recognition of the "improper" operation is detected at its first occurrence. However, recognizing that such may not be the case, the tool also provides advanced options that allow a user to reconfigure the assembly binds to previous date/time stamps (snapshots) to maximize the possibility of achieving a configuration that is satisfactory to the user. The tool also preferably provides a safe mode that enables the option to reconfigure the assembly binds for an application to its default settings or reference version. That is, the safe mode requires that the version with which the application was tested when the application developer/deployer released the application initially. It can be a per-assembly setting, or global for all assemblies used by the application.

As may now be apparent, the system and method of the present invention persists for later diagnosis and analysis all the information relevant in determining the final version (i.e. post policy reference) of an assembly that is returned by an application bind request. Such information includes a description of the original assembly referenced, as well as the version redirect information from each stage in the policy resolution process. The system and method of the present invention maintains the dates/time "snapshots" when applications were known to execute with a particular set of assemblies. Each "snapshot" reflects a time when a different version of an assembly is used by the application than it used in the most previous invocation. These "snapshots" are recorded in a bind history data structure that, at the top-most level, is organized by application name and by the user that executed the application. A directory is created in the non-roaming user-profile directory to record all the bind policy history file logs. One log file is created for each application that is run on the system. Within this history file, the entire set of assemblies that were used by that application, along with the bind policy history information, is stored and indexed by the date/time "snapshots" described above.

Through the system and method of the present invention, the persisted information can be analyzed to pinpoint exact differences between different invocation "snapshots". Recommendations and/or repairs can then be performed to restore the application to the state where the assembly binding matched the desire behavior. This rollback/repair mechanism is accomplished through persisting and analyzing the bind policy information. The present invention performs dynamic, run-time analysis of assembly binds in the context of a running application. It categorizes information about the set of assemblies used by the application at a particular time, and only when there are detectable changes in the assemblies used by the application will new "snapshots" be recorded. That is, each date/time "snapshot" reflects dates when at least one assembly requested by the application resulted in the retrieval of a different version than used in the most recently recorded "snapshot."

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 5 is a simplified illustration of a assembly bind history file data structure constructed in accordance with the teachings of the present invention;

DETAILED DESCRIPTION OF THE INVENTION

Figure 1:
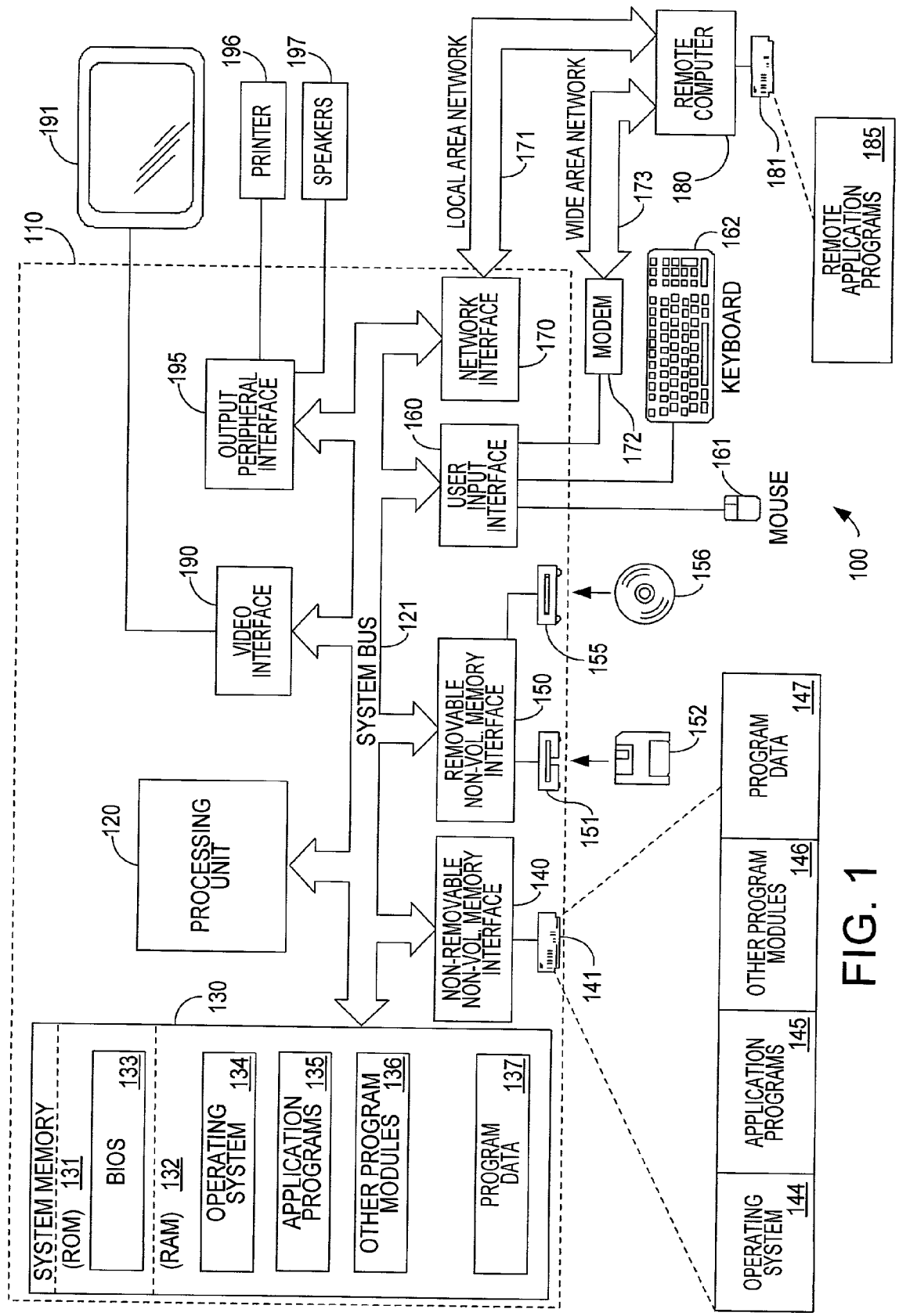
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As described in the background section above, when a user runs an application on a computer platform such as that just described, requests for binds for different assemblies are made by the application to retrieve objects that expose certain desired functionality. The computer operating system typically handles these requests by locating and returning the proper assembly requested by the application. Typically, when an application is compiled, references to the assemblies needed by that application are recorded within the application binary itself. However, recognizing that changes to these assemblies may be desired in the future, a preferred operating system provides a flexible policy mechanism whereby various parties can change these references without having to recompile the application. Specifically, these various parties can change an application's request for one version of an assembly to another version of the same assembly. While the format of such policy may vary depending upon the particular operating system utilized, in a Windows environment such policy is expressed in the form of XML files.

While the problem discussed in the background section above results from overwriting an older version of an assembly with a newer version upon installation of a different application program, the system and method of the present invention preferably operate with an operating system that allows multiple versions of an assembly to be stored in the shared store. To differentiate these different versions of the assemblies, they may be assigned a cryptographic signature called a strong name. This provides name uniqueness for the assembly and prevents another user or application from taking over the name of the assembly, either as a result of name spoofing for malicious purposes, or through mere inadvertence. When a new assembly is deployed that will be shared among many applications on the same computer, it must have a strong name or utilize another mechanism that allows for multiple versions to be stored to prevent the problem discussed above. These assemblies, which may be provided by third-party developers, are installed in a common location in the system. By default, the system looks for each program's components or assemblies in that common or shared location, which is known as the global assembly cache (GAC) in a Microsoft Windows environment. The location of such a shared store will vary based upon the particular operating system.

In prior COM+applications, this mechanism is heavily dependent of the registry, where information about each component is stored including information about its version and physical file location. Unfortunately, while this prior method allows multiple applications to share a single component, it also allows situations where installing a component with one application can overwrite the existing installed component, possibly causing other applications to break as discussed above. Also as discussed above, this situation is often difficult to detect since the offending application appears to work fine and, by the time the broken application is run, it might not be possible to recover the common files to a stable configuration.

As just indicated, the solution to this problem is to more strongly associate a distinct build of a component assembly with the client application. This distinct build may be indicated by the combination of four fields that uniquely identify the assembly: name, version, public key token, and culture. The system can then be sure to isolate these component assemblies so that different versions can be running at the same time for different client applications, something that was not possible in previous operating systems. This system of protection may be referred to as side-by-side execution (in contrast to backward compatible execution), since applications can run along side other versions of the same applications without affecting their respective execution environments.

To mark an assembly as sharable, it must be signed using a private key. This private key has a public key pair that may be used for verification. Once the private key has been generated, the assembly may be signed, specifying the key file to be assigned to that assembly. In the Windows environment, such assembly construction utilizes a strong name tool (SN.exe), a detailed description of which is beyond the scope of this application.

Figure 2:
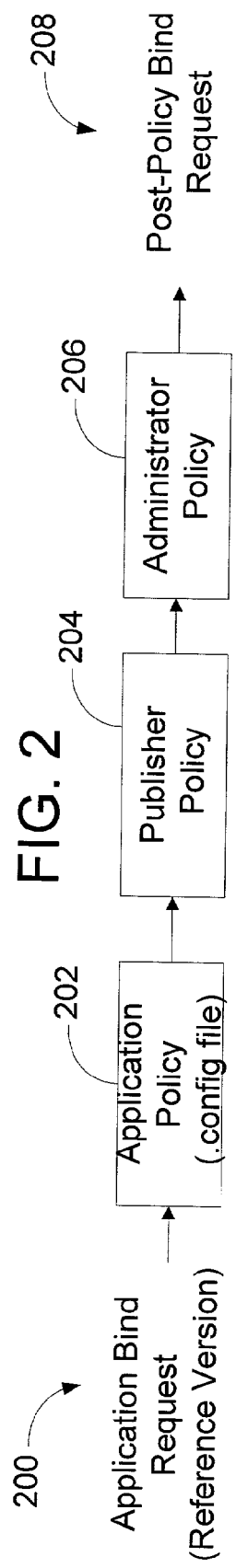
FIG. 2 is simplified policy flow diagram illustrating application bind request version redirection.

Once the shared assembly is stored in the common location, assembly binding (policy) redirections that change the reference version stored in the application binary itself may occur. As illustrated in FIG. 2, this policy redirection may happen at three levels. That is, the referenced version of the application bind request 200 may be changed as a result of an application policy 202, a publisher policy 204, and by an administrator policy 206 to derive the post policy bind request 208 that is actually used to return a version of the assembly for use with the application program. Because changes in binding policy will result in the application using different assemblies than those with which it was originally tested, there is always a chance that this change may result in undesirable or malfunctioning behavior. Therefore, the system of the present invention performs dynamic, run-time analysis of assembly binds in the context of a running application, taking into account each stage of the bind redirection through processing of each policy illustrated in FIG. 2.

Each of the levels of bind policy illustrated in FIG. 2 effectuate control of the application bind process as concerned by different entities. That is, the application policy 202 is typically contained in a .config file that is typically shipped with the application. This .config file is typically generated by the application programming entity to affect bind redirections to different versions of component assemblies that could result from, for example, bug fixes in subsequent releases of the application, to provide added functionality exposed by newer versions of a referenced component, etc. In a Windows operating system environment, this .config file is an XML file, although those skilled in the art will recognize that other formats in different operating systems may also be utilized without departing from the present invention.

The publisher policy 204 typically effectuates changes in assemblies directed by the operating system manufacturer or by anyone who publishes shared components that may be stored in the GAC. For example, such publisher policy bind redirections may be the result of testing that has revealed a security hole in the current version of a shared component assembly used by many different applications. In such a case, a "fix" (which includes new assembly+publisher policy with the redirect information) would be downloaded so that all applications that rely on that shared component may take advantage of the solution to a global problem with that assembly. However, since the publisher policy 204 typically addresses global type issues, it is envisioned that a majority of individual application malfunctions may occur as a result of this publisher policy redirection 204.

Finally, the processing of the administrator policy bind redirection 206 allows for corporate network administrators or other IT professionals to control operation within their networks to effectuate corporate security/policy directives. Indeed, such administrator policy bind redirections may require specific authorization or approval (e.g. admin access) before bind redirections directed thereby may be bypassed or countermanded. That is, a corporate IT professional may not wish to have a prior version of an assembly utilized by anyone within the corporate network, even if such results in erroneous operation for a minority of application programs run by a few of the corporate network users.

The system and method of the present invention may be thought of as containing two components or two main functional processes to provide the functionality described above. Specifically, one component of the present invention effectuates the persistence of the bind history information, while another component retrieves this persisted information so that a user may roll back the configuration of the application to a point when the application performed as expected. Preferably, the information to be stored on disk is recorded in an in-memory data structure, which is passed to the writer component to persistence to disk immediately before a successful bind completes. However, this process may be deferred until process shut-down as an optimization.

Figure 3:
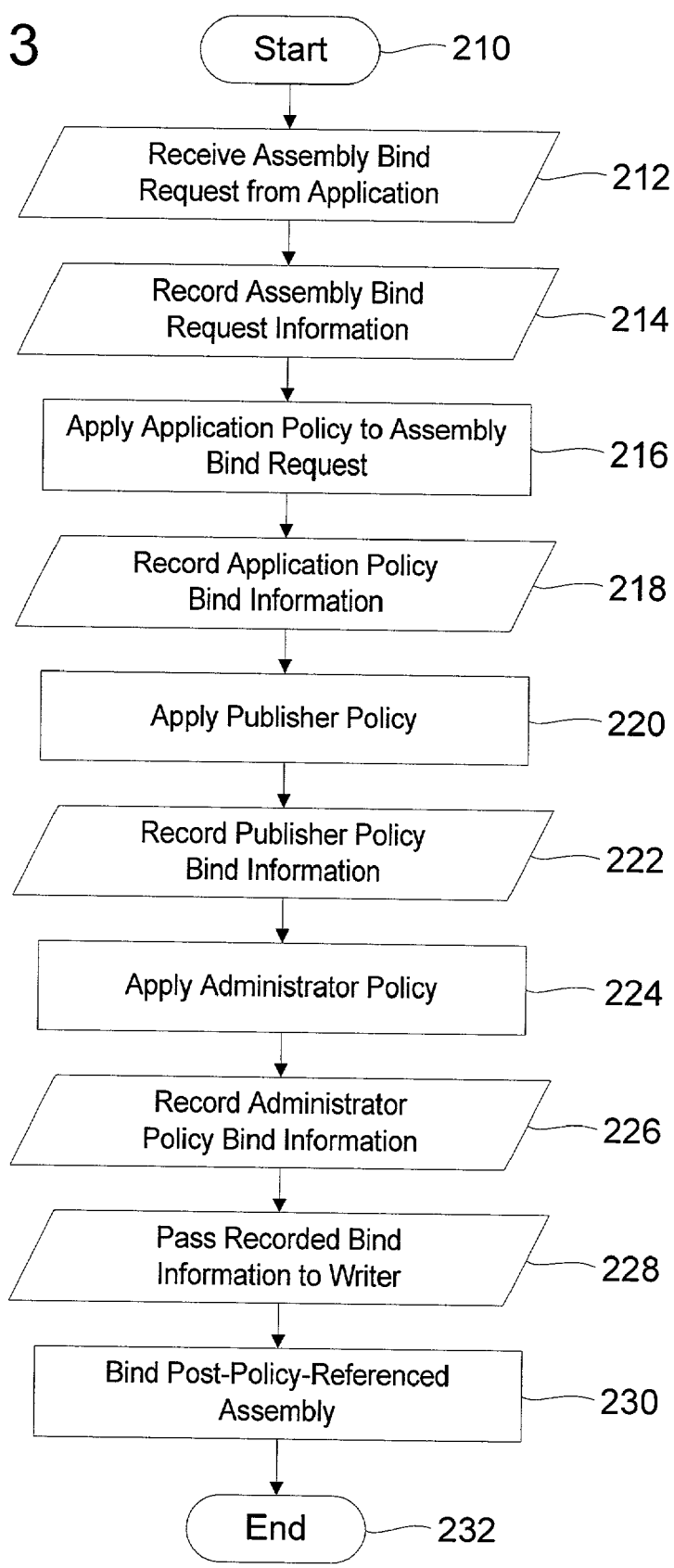
FIG. 3 is a simplified assembly bind request flow diagram illustrating an aspect of the present invention.

To illustrate the initial collection of the bind information as the bind policies are executed, attention is directed to the simplified flow diagram of FIG. 3. Once this process starts 210 the assembly bind request from the application is received at step 212. This information is recorded 214 and reflects the reference version called by the application. Once the application policy is applied 216 to the assembly bind request, this application policy bind information is recorded at step 218. As illustrated and discussed in FIG. 2, the publisher policy is then applied 220. The information regarding the publisher policy bind redirection is then recorded 222 before the administrator policy is applied at step 224. This administrator policy bind redirection information is also recorded 226, and all of the recorded bind information is passed 228 to the component responsible for persisting the bind policy information to disk. The binding of the post policy referenced assembly is accomplished 230 before this process ends 232.

Figure 4:
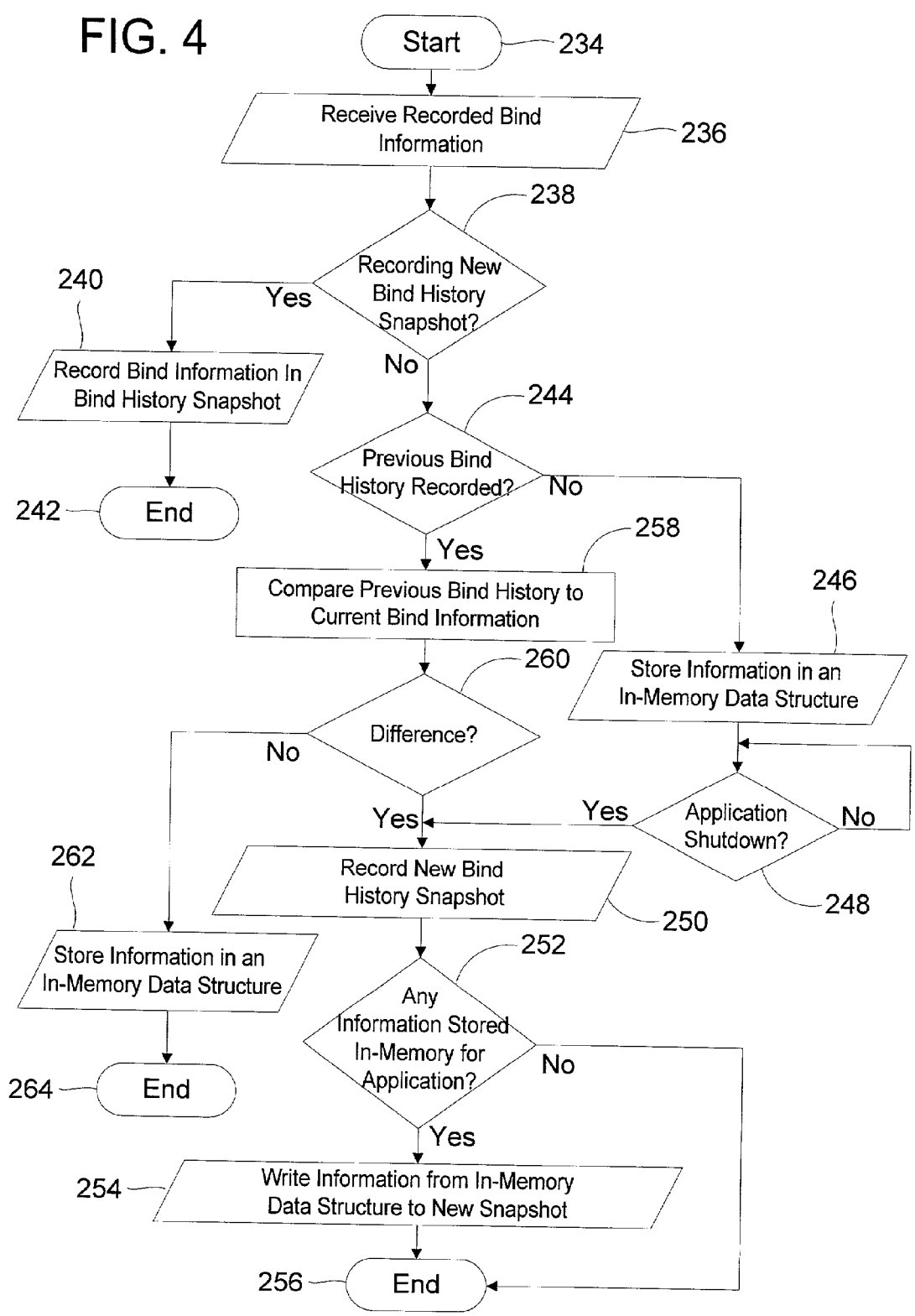
FIG. 4 is a simplified flow diagrammatic illustration of the assembly bind history file writing procedure in accordance with an aspect of the present invention.

The component that is responsible for writing the bind history information to disk needs to assess whether the current bind information passed at step 228 should be appended to the most recent "snapshot" recorded, or if a new "snapshot" should be recorded for all assemblies of the current application. In flow diagrammatic form this process is illustrated in FIG. 4. Once begun 234, the recorded bind information is received at step 236. This is the same information that was passed by step 228 of FIG. 3. The system of the present invention first checks to determine if it is currently in the process of recording a new bind history "snapshot" at step 238. If the system of the present invention determines that it is currently recording a new bind history "snapshot," the bind information is recorded in that bind history "snapshot" for the current application at step 240 before the process ends 242. However, if the system of the present invention is not currently recording a new bind history "snapshot", the system then checks to determine whether there exists a previous bind history record for this application at step 244.

If no previous bind history has been recorded to disk (such as is the case when an application is run for the first time), the information is stored in an in-memory data structure at step 246 until the application program is shut down as determined by step 248. In this situation, once the application program is shut down a new bind history "snapshot" is recorded as indicated by step 250. Similarly, if the application had been run before (and hence a previous snapshot had been created) and the binds in the current run did not change except that the application used an additional assembly not used in the previous run, the information is rolled into the current, most recent snapshot. In this recording process, the system of the present invention checks to determine if there is any information stored in memory for the current application at step 252. If there is such information, that information is written to the "snapshot" at step 254. If there is no such information, or once such information is written into the "snapshot", the process ends 256.

If, at step 244, it is determined that a previous bind history record does exist, the system of the present invention compares the previous bind history information to the current bind history information at step 258 to determine if any difference exists between the previous bind history record and that information generated by the most recent assembly bind. If it is determined that there is no difference between the bind information previously recorded and currently generated at step 260, the current information is simply stored in an in-memory data structure at step 262 before this process ends 264. This information may be utilized to form a new assembly bind history record if any differences are found to exist in subsequent assembly binds for the current application. That is, once a difference is detected at step 260 between the previous bind information for an assembly and that which is currently bound for the current application, a new bind history "snapshot" is recorded as indicated by step 250. Once this process has begun, step 252 checks to determine it there is any information stored in an in-memory data structure. Such information could have come from step 246 or step 262 discussed above. If such information exists for other assemblies for the current application, step 254 writes this information from the in-memory data structure to the new "snapshot" before the process ends at step 256.

To gain a fuller understanding of the practical functioning of the previous flow diagrams of the system of the present invention, attention is directed to the two bind history data structures illustrated in FIG. 5. Each of these two "snapshots" are associated with the application program calculator, are indexed by their respective temporal (e.g., date/time) information, and are stored in a directory created in the non-roaming user-profile directory on the system. At the top most level, this bind policy history information is organized by application name, and by the user that executed the application. One log file is created for each application that is run on the system. Within this file, the entire set of assemblies that were used by that application, along with the bind policy history information, is stored and indexed by the date/time "snapshots".

As illustrated in each of the two "snapshots" 266, 268 illustrated in FIG. 5, each assembly (system, math, etc.) is stored along with the assembly version information for each stage in the bind policy execution. In the exemplary "snapshots" illustrated in FIG. 5, four bind versions are accounted for each assembly, including the reference version, the version resulting from application of the application policy, the version resulting from application of the publisher policy, and the post policy bind request resulting from the application of the administrator policy. In FIG. 5, the first "snapshot" 266 illustrates that version 1.0.0.0 is binded for each of the two assemblies illustrated (system and math) for the application program (calculator). In the second "snapshot" 268, the assembly bind information for the math assembly differs from that of the previous "snapshot" 266 for the calculator application.

In the following example, it is assumed that the calculator application has never been run on the system and that there are no bind policy redirections at its first running for any of the assemblies to which the application program binds. It is further assumed that the order in which the binds are processed in this example is the system assembly, then the math assembly, etc., although the order is irrelevant.

When the calculator program is first executed, the code will request each of the assemblies that it requires. Since no bind policy history information has previously been recorded, the bind information for each of these separate binds to these separate assemblies is stored in an in-memory data structure at step 246 of the process illustrated in flow diagrammatic form in FIG. 4. At application shut down, the system recognizes that no bind history has ever been recorded, so an initial bind history file is created and all of the information stored in memory for the calculator program is written into the new "snapshot" (illustrated in FIG. 5 as "snapshot" 266).

Now assume that a publisher policy is installed that changes the version of the math assembly from version 1.0.0.0 to version 1.0.0.1. If the calculator program is run after this publisher policy has taken effect, the assembly bind to the system assembly (which takes place in this example before a bind to the math assembly) will not reveal any difference in the previous bind history stored in "snapshot" 266 with that of the current running of the calculator program. Therefore, at step 262 the system assembly bind information will be stored in an in-memory data structure. However, when the calculator program performs the bind to the math assembly, the information recorded will reveal a difference at step 260 of the process of FIG. 4, and will, therefore, necessitate the recording of a new bind history "snapshot" at step 250. Once the new "snapshot" is formed, the previous information regarding the bind to the system assembly that was stored in memory will also be written to the new bind history data structure "snapshot" at step 252.

As the calculator program accomplishes additional binds to other assemblies step 238 will recognize that a new bind history "snapshot" is being recorded, and will therefore record the bind information for each of these additional assemblies in the new bind history "snapshot" at step 240. All further assemblies required by the calculator program will also be written to the new bind history "snapshot" in the same manner.

If, in this or subsequent uses of the calculator program, the user determines that this application program is functioning in a manner different than the prior functionality, or in a way that does not suit the user's preferences as a result of the bind redirection for one or more of the assemblies utilized by this application, the user may invoke the application restore tool that forms a part of the system and method of the present invention.

Figure 6:
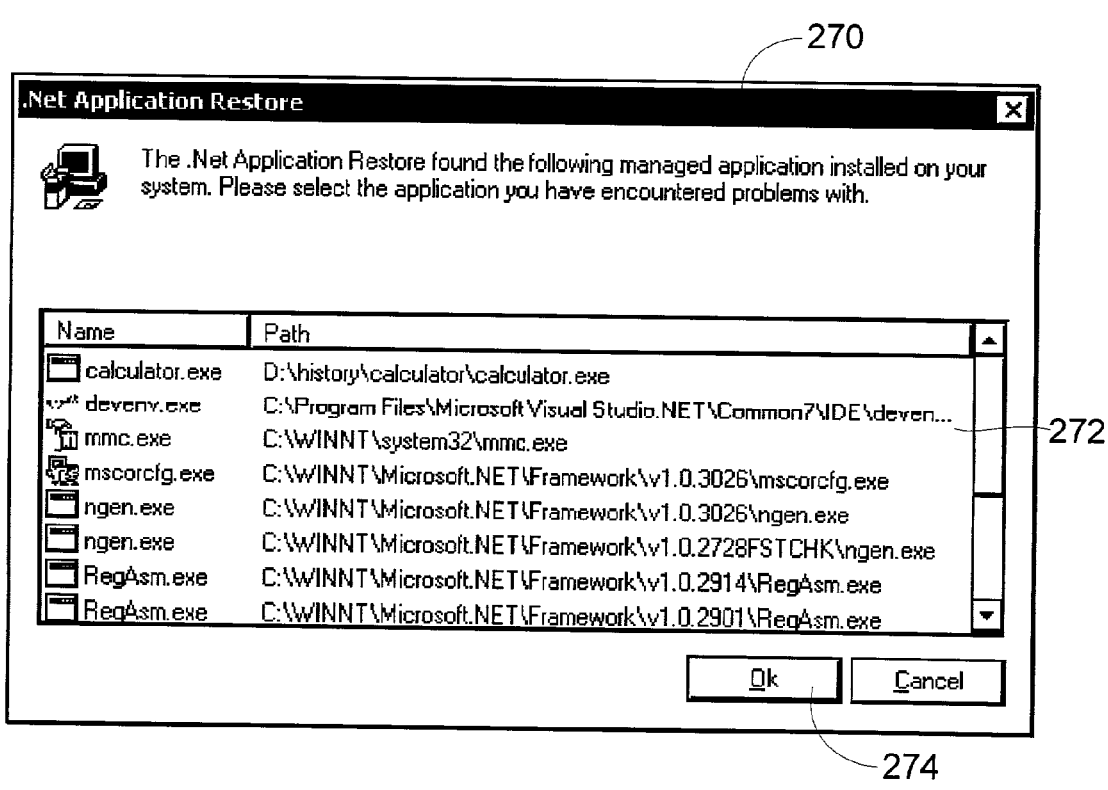
FIG. 6 is an exemplary user interface diagram illustrating an application restore tool constructed in accordance with the teachings of the present invention.
Figure 7:
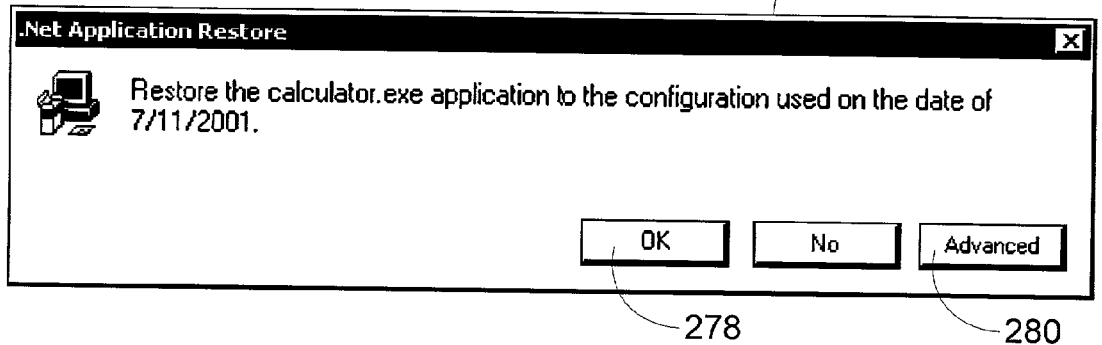
FIG. 7 is an additional user interface diagram illustrating additional aspects of the application restore tool.

When this tool is invoked, a user interface window 270 such as that illustrated in FIG. 6 is displayed for the user. In this first user interface window 270, instructions are provided that indicate which of the applications installed on the system are available for application restore, that is, which applications have application bind history files stored in the system. Each of these applications are displayed for user selection in a window 272 that lists, preferably, both the application name and the path in which the application is stored. Once the user has found the application with which the user has encountered a problem, the user simply selects the application entry from window 270 and selects the ok button 274.

Once an application has been selected by the user, the application restore tool displays a user interface window 276 that informs the user that the selected application will be restored to the prior configuration identified by date. If this meets the user needs, the user need only select the ok button 278 to restore the application to that prior configuration.

Figure 8:
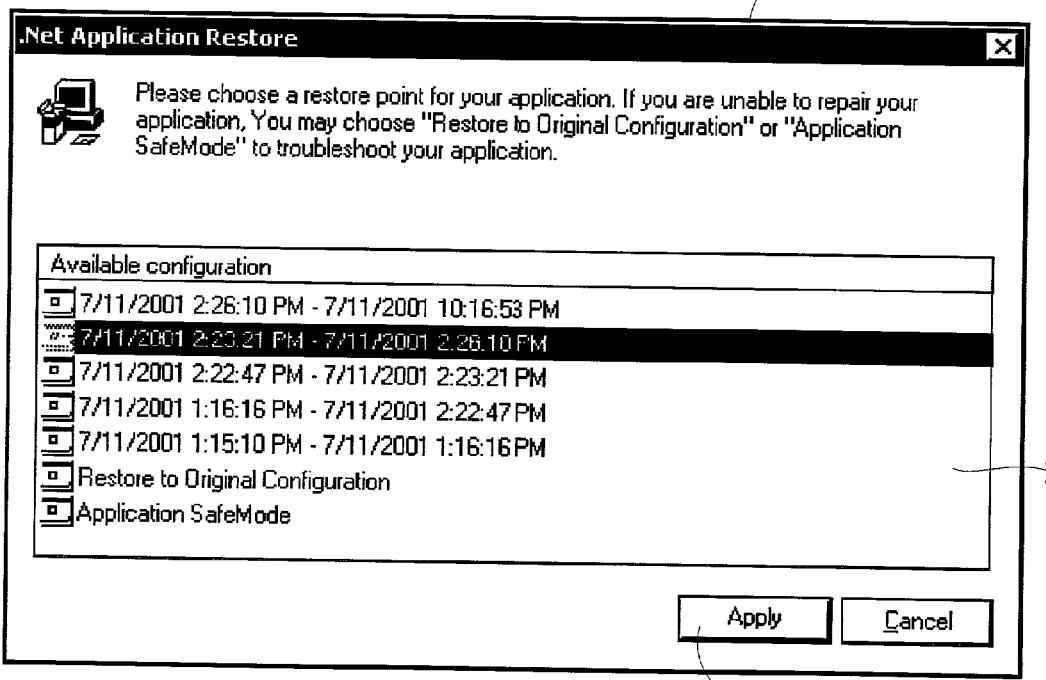
FIG. 8 is an additional user interface diagram illustrating additional aspects of the application restore tool.
Figure 9:
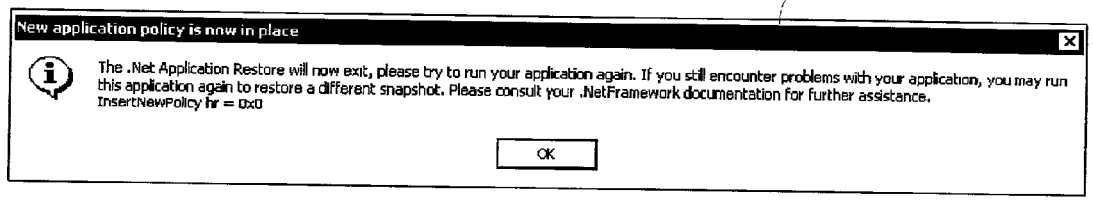
FIG. 9 is an additional user interface diagram illustrating additional aspects of the application restore tool.

If, however, this prior configuration does not meet the needs of the user, the user may select the advanced options button 280 for more options. When this button is selected, a user interface 282 such as that illustrated in FIG. 8 is displayed. In this user interface 282 all of the available configurations for the selected application are displayed for the user selection in a window 284. Each of these configurations relate to a prior bind history "snapshot" that was assembled during a prior configuration of the application. Additionally, an option is provided so that the user may restore the application to the original configuration, or to an application safe mode that allows individual binds to particular versions of the assemblies required for operation of the application. This takes the user back to the state where the assemblies used by the application are the versions that were originally intended by the application developer (ie. avoids applying publisher policy). Once one of the application configurations is selected, the user simply selects the apply button 286 to restore the application to a previous configuration. A final user interface 288 illustrated in FIG. 9 may displayed to the user to provide additional instructions regarding the restore process. This tool will then ensure that proper programmatic steps can be executed to create configuration files that describe the new binding policy redirect information to force the application to use the intended version of the assemblies required by that application.

In addition to the above, the bind history information may be extracted to provide a variety of statistics about the assemblies used by an application. These include determining which assemblies are actually used by an application, determining what policies, if any, apply to assemblies being used by an application, determining which applications are using particular assemblies stored in the assembly cache, etc.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a computer system having a graphical user interface including a display and a user interface selection device, a computer-implemented method of providing and selecting assembly binds from a menu on the display, said method comprising;
   retrieving a listing of applications having at least one assembly bind history file;
   displaying the listing on the display for user selection;
   receiving a user selection of one of the applications;
   retrieving a most recent assembly bind history file for the selected application, said most recent assembly bind history file containing information of assembly binds from a previous execution of the application having at least one assembly bind that differs from a current assembly bind for that application;
   displaying information on the display indicating temporal information of the most recent assembly bind history file;
   providing a user confirmation selection;
   recording a predetermined set of one or more assembly binds for the application that are known to safely operate with the application; and
   binding all assemblies for the application using a predetermined set of one or more assemblies that are known to safely operate with the application.

2. The method of claim 1, further comprising the steps of displaying an advanced reconfiguration option selection, receiving a user selection of the advanced reconfiguration option, retrieving all of the assembly bind history files for the selected application, and displaying a listing of all of the assembly bind history files for user selection.

3. The method of claim 2, further comprising the steps of receiving a user selection of one of the assembly bind history files, and reconfiguring an assembly bind policy for the application to ensure assembly binding in accordance with the selected assembly bind history file.

* * * * *